(12) United States Patent  (10) Patent No.: US 7,890,702 B2
Lauterbach  (45) Date of Patent: Feb. 15, 2011

(54) PREFETCH INSTRUCTION EXTENSIONS

(75) Inventor: Gary Lauterbach, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 697 days.

(21) Appl. No.: 11/944,870

(22) Filed: Nov. 26, 2007

(65) Prior Publication Data

US 2009/0138661 A1   May 28, 2009

(51) Int. Cl.
G06F 12/00 (2006.01)
(52) U.S. Cl. ...................................................... 711/137
(58) Field of Classification Search ........................ None
See application file for complete search history.

(56) References Cited

U.S. PATENT DOCUMENTS

| 6,457,101 | B1 |   | 9/2002  | Bauman et al. |         |
|-----------|----|---|---------|---------------|---------|
| 6,643,745 | B1 | * | 11/2003 | Palanca et al.| 711/138 |
| 6,865,652 | B1 |   | 3/2005  | Pencis et al. |         |
| 7,003,633 | B2 |   | 2/2006  | Glasco        |         |
| 7,103,725 | B2 |   | 9/2006  | Glasco        |         |
| 7,107,408 | B2 |   | 9/2006  | Glasco        |         |
| 7,177,985 | B1 |   | 2/2007  | Diefendorff   |         |
| 7,194,582 | B1 |   | 3/2007  | Diefendorff et al. |    |
| 7,512,740 | B2 |   | 3/2009  | Diefendorff   |         |
| 2004/0128291 | A1 | * | 7/2004 | Pentkovski  | 707/8   |

* cited by examiner

Primary Examiner—Brian R Peugh
(74) Attorney, Agent, or Firm—Rory D. Ranklin; Meyertons, Hood, Kivlin, Kowert & Goetzel, P.C.

(57) ABSTRACT

A computer system and method. In one embodiment, a computer system comprises a processor and a cache memory. The processor executes a prefetch instruction to prefetch a block of data words into the cache memory. In one embodiment, the cache memory comprises a plurality of cache levels. The processor selects one of the cache levels based on a value of a prefetch instruction parameter indicating the temporal locality of data to be prefetched. In a further embodiment, individual words are prefetched from non-contiguous memory addresses. A single execution of the prefetch instruction allows the processor to prefetch multiple blocks into the cache memory. The number of data words in each block, the number of blocks, an address interval between each data word of each block, and an address interval between each block to be prefetched are indicated by parameters of the prefetch instruction.

20 Claims, 10 Drawing Sheets

Data Prefetch Instruction 200

| Opcode 210 | 211 | 212 |  | 218 | 219 | 220 | 221 |

| Bit Field | Parameter |
|-----------|-----------|
| 211 | Address |
| 212 | Block Size: 8 - 1024 bytes |
| 218 | Temporal Locality: once/infrequent/frequent |
| 219 | Read/Write |
| 220 | Direct/Indirect |
| 221 | Weak/Strong |

Data Prefetch Instruction 200

| Opcode 210 | 211 | 212 | | 218 | 219 | 220 | 221 |
|---|---|---|---|---|---|---|---|

| Bit Field | Parameter |
|---|---|
| 211 | Address |
| 212 | Block Size: 8 - 1024 bytes |
| 218 | Temporal Locality: once/infrequent/frequent |
| 219 | Read/Write |
| 220 | Direct/Indirect |
| 221 | Weak/Strong |

FIG. 2

Stream Prefetch Instruction 700

| Opcode 710 | 711 | 712 | 713 | 714 | 715 | 716 | 717 | 718 | 719 | 720 | 721 |

| Bit Field | Parameter |
|---|---|
| 711 | Start Address |
| 712 | Block Size: 8 - 256 bytes |
| 713 | Block Count: 1-256 |
| 714 | Sync Count: 0-255 |
| 715 | Block Stride Between Blocks: 8 - 2^32 |
| 716 | Sync Stride Between Syncs: 0 - 2^32 |
| 717 | Stream Number: 0-31 |
| 718 | Temporal Locality: once/infrequent/frequent |
| 719 | R/W |
| 720 | Direct/Indirect |
| 721 | Weak/Strong |

FIG. 7

Hint Prefetch Instruction 1000

| Opcode 1010 | 1011 | 1012 | 1013 | 1014 | 1015 | 1016 | 1017 | 1018 | 1019 | 1020 | 1021 |

| Bit Field | Parameter |
| --- | --- |
| 1011 | Start Address |
| 1012 | Block Size: 8 - 256 bytes |
| 1013 | Block Count: 1-256 |
| 1014 | Sync Count: 0-255 |
| 1015 | Block Stride Between Blocks: 8 - 2^32 |
| 1016 | Sync Stride Between Syncs: 0 - 2^32 |
| 1017 | Stream Number: 0-31 |
| 1018 | Temporal Locality: once/infrequent/frequent |
| 1019 | R/W |
| 1020 | Direct/Indirect |
| 1021 | Weak/Strong |

FIG. 10

PREFETCH INSTRUCTION EXTENSIONS

BACKGROUND OF THE INVENTION

1. Field of the Invention

This invention relates to microprocessors and, more particularly, to microprocessor prefetch instructions.

2. Description of the Related Art

Microprocessor designers have attempted to achieve higher performance through a variety of improvements to standard instruction sets such as the superscalar, reduced instruction set computer (RISC) architectures. For example, instructions may attempt to take advantage of multiple memory caches, arranged hierarchically and shared by multiple cores or execution units to hide memory latency. A variety of caching architectures are used and include various combinations of on-chip cache and off-chip cache. Since cache accesses are faster than memory accesses, various caching techniques are used to increase the likelihood that data is located in a cache when a core or execution unit needs to access it, thereby improving the bandwidth of memory access operations. Support for types of instructions know as prefetches may be added to microprocessor designs so that data or instructions may be loaded into cache memory before the microprocessor needs them. Prefetching data offers the performance advantage of the relatively faster access time of cache memory compared to system memory.

In addition to the above considerations, there are times when streams of data or large patterns of data may be needed by a microprocessor. Although prefetching data offers some performance advantages, repetitive execution of prefetch instructions to load a data stream or a large pattern of data may be inefficient. In addition, different specialized instructions that handle different patterns of data have been implemented. Each of these instructions may have its own unique format and semantics for communicating the structure of a data set between the programmer and the microprocessor's hardware. These differences complicate the job of programmers and compiler designers who attempt to use these instructions. In order to address the above concerns, what is needed is a way to improve prefetch instructions for a variety of data sets using consistent semantics.

SUMMARY

Various embodiments of computer system and methods are disclosed. In one embodiment, a computer system comprises a processor and a cache memory. The processor is configured to execute a prefetch instruction. A single execution of the prefetch instruction allows the processor to prefetch a block of data words into the cache memory. In one embodiment, the prefetch instruction includes a first parameter indicating the temporal locality of data to be prefetched. In a further embodiment, the cache memory comprises a plurality of cache levels. The processor is configured to select one of the cache levels in which to prefetch the block of data words based on a value of the first parameter.

In a further embodiment, individual words of the block of data words are prefetched from non-contiguous memory addresses. A single execution of the prefetch instruction allows the processor to prefetch a plurality of blocks of data words into the cache memory. In a still further embodiment, the prefetch instruction includes a second parameter indicating a number of data words in each block of data words and a third parameter indicating a number of blocks of data words to be prefetched by a single execution of the prefetch instruction. In yet another embodiment, the prefetch instruction includes a fourth parameter indicating an address interval between each data word of each block of data words and a fifth parameter indicating an address interval between each block of data words of the plurality of blocks of data words. In yet another embodiment, the prefetch instruction includes a sixth parameter indicating a prefetch priority level. The processor is configured to determine whether or not to perform a prefetch operation based on a value of the sixth parameter.

These and other embodiments will become apparent upon consideration of the following description and accompanying drawings.

BRIEF DESCRIPTION OF THE DRAWINGS

FIG. 2 illustrates one embodiment of a data prefetch instruction.

FIG. 7 illustrates one embodiment of a stream prefetch instruction 700.

FIG. 10 illustrates one embodiment of a hint prefetch instruction 1000.

Figure 1:
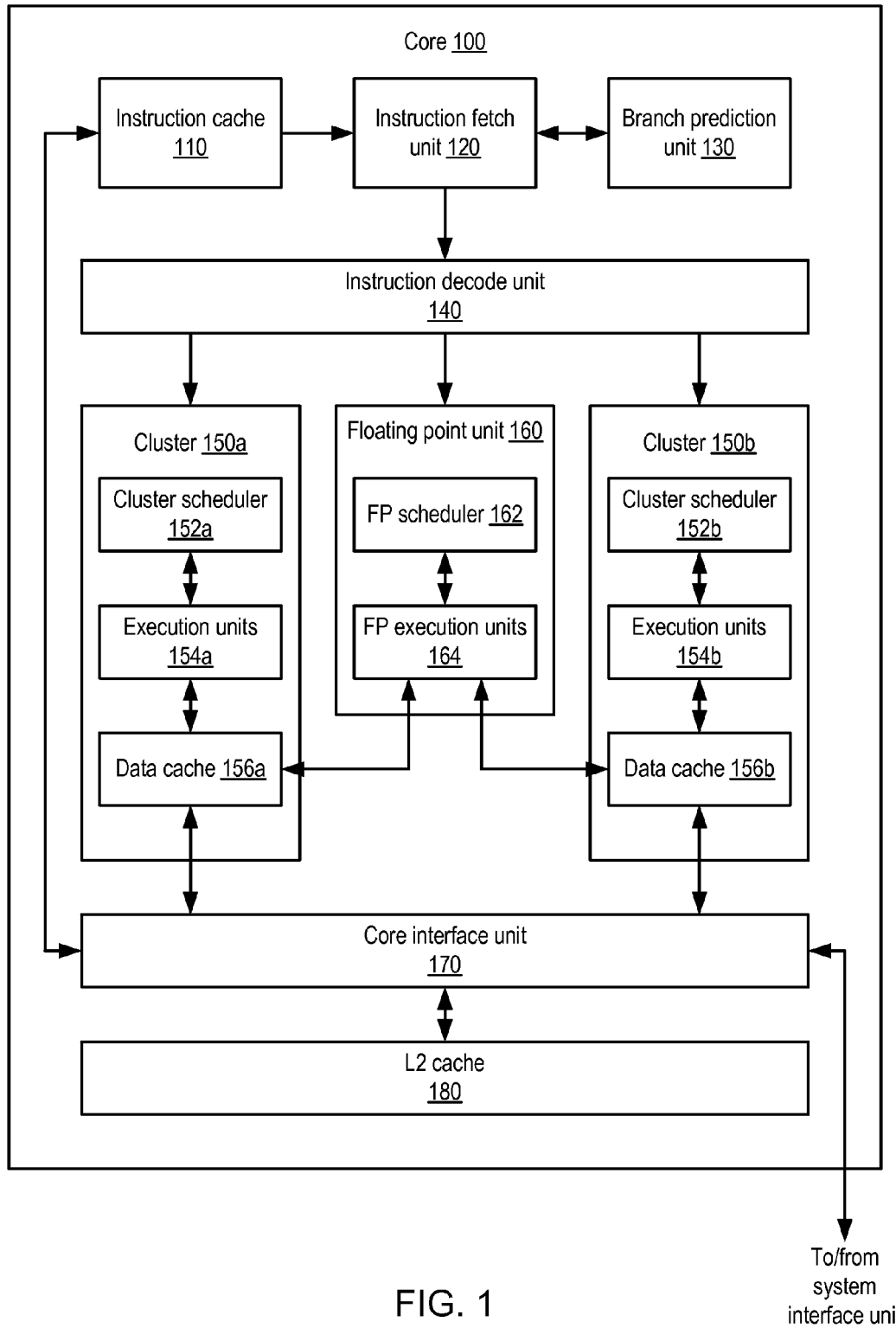
FIG. 1 illustrates one embodiment of a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Processor Core

FIG. 1 illustrates one embodiment of a processor core 100. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 110 coupled to provide instructions to an instruction fetch unit (IFU) 120. IFU 120 may be coupled to a branch prediction unit (BPU) 130 and to an instruction decode unit 140. Decode unit 140 may be coupled to provide operations to a plurality of integer execution clusters 150*a-b* as well as to a floating point unit (FPU) 160. Each of clusters 150*a-b* may include a respective cluster scheduler 152*a-b* coupled to a respective plurality of integer execution units 154*a-b*. Clusters 150*a-b* may also include respective data caches 156*a-b* coupled to provide data to execution units 154*a-b*. In the illustrated embodiment, data caches 156*a-b* may also provide data to floating point execution units 164 of FPU 160, which may be coupled to receive operations from FP scheduler 162. Data caches 156*a-b* and instruction cache 110 may additionally be coupled to core interface unit 170, which may in turn be coupled to a unified L2 cache 180 as well as to a system interface unit (SIU) that is external to core 100 (shown in FIG. 2 and described below). It is noted that although FIG. 1 reflects certain instruction and data flow paths among various units, additional paths or directions for data or instruction flow not specifically shown in FIG. 1 may be provided.

As described in greater detail below, core 100 may be configured for multithreaded execution in which instructions from distinct threads of execution may concurrently execute. In one embodiment, each of clusters 150*a-b* may be dedicated to the execution of instructions corresponding to a respective one of two threads, while FPU 160 and the upstream instruction fetch and decode logic may be shared among threads. In other embodiments, it is contemplated that different numbers of threads may be supported for concurrent execution, and different numbers of clusters 150 and FPUs 160 may be provided.

Instruction cache 110 may be configured to store instructions prior to their being retrieved, decoded and issued for execution. In various embodiments, instruction cache 110 may be configured as a direct-mapped, set-associative or fully-associative cache of a particular size, such as an 8-way, 64 kilobyte (KB) cache, for example. Instruction cache 110 may be physically addressed, virtually addressed or a combination of the two (e.g., virtual index bits and physical tag bits). In some embodiments, instruction cache 110 may also include translation lookaside buffer (TLB) logic configured to cache virtual-to-physical translations for instruction fetch addresses, although TLB and translation logic may be included elsewhere within core 100.

Instruction fetch accesses to instruction cache 110 may be coordinated by IFU 120. For example, IFU 120 may track the current program counter status for various executing threads and may issue fetches to instruction cache 110 in order to retrieve additional instructions for execution. In the case of an instruction cache miss, either instruction cache 110 or IFU 120 may coordinate the retrieval of instruction data from L2 cache 180. In some embodiments, IFU 120 may also coordinate prefetching of instructions from other levels of the memory hierarchy in advance of their expected use in order to mitigate the effects of memory latency. For example, successful instruction prefetching may increase the likelihood of instructions being present in instruction cache 110 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 130 may generally be configured to predict future fetch addresses for use by IFU 120. In some embodiments, BPU 130 may include a branch target buffer (BTB) that may be configured to store a variety of information about possible branches in the instruction stream. For example, the BTB may be configured to store information about the type of a branch (e.g., static, conditional, direct, indirect, etc.), its predicted target address, a predicted way of instruction cache 110 in which the target may reside, or any other suitable branch information. In some embodiments, BPU 130 may include multiple BTBs arranged in a cache-like hierarchical fashion. Additionally, in some embodiments BPU 130 may include one or more different types of predictors (e.g., local, global, or hybrid predictors) configured to predict the outcome of conditional branches. In one embodiment, the execution pipelines of IFU 120 and BPU 130 may be decoupled such that branch prediction may be allowed to "run ahead" of instruction fetch, allowing multiple future fetch addresses to be predicted and queued until IFU 120 is ready to service them. It is contemplated that during multi-threaded operation, the prediction and fetch pipelines may be configured to concurrently operate on different threads.

As a result of fetching, IFU 120 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking decode unit 140 may be configured to identify instruction boundaries within fetch packets, to decode or otherwise transform instructions into operations suitable for execution by clusters 150 or FPU 160, and to dispatch such operations for execution.

In one embodiment, DEC 140 may be configured to first determine the length of possible instructions within a given window of bytes drawn from one or more fetch packets. For example, for an x86-compatible ISA, DEC 140 may be configured to identify valid sequences of prefix, opcode, "mod/rm" and "SIB" bytes, beginning at each byte position within the given fetch packet. Pick logic within DEC 140 may then be configured to identify, in one embodiment, the boundaries of up to four valid instructions within the window. In one embodiment, multiple fetch packets and multiple groups of instruction pointers identifying instruction boundaries may be queued within DEC 140, allowing the decoding process to be decoupled from fetching such that IFU 120 may on occasion "fetch ahead" of decode.

Instructions may then be steered from fetch packet storage into one of several instruction decoders within DEC 140. In one embodiment, DEC 140 may be configured to dispatch up to four instructions per cycle for execution, and may correspondingly provide four independent instruction decoders, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 150 or FPU 160. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 140 may be configured to examine the state of queued operations awaiting dispatch in conjunction with the state of execution resources and dispatch rules in order to attempt to assemble dispatch parcels. For example, DEC 140 may take into account the availability of operations queued for dispatch, the number of operations queued and awaiting execution within clusters 150 and/or FPU 160, and any resource constraints that may apply to the operations to be dispatched. In one embodiment, DEC 140 may be configured to dispatch a parcel of up to four operations to one of clusters 150 or FPU 160 during a given execution cycle.

In one embodiment, DEC 140 may be configured to decode and dispatch operations for only one thread during a given execution cycle. However, it is noted that IFU 120 and DEC 140 need not operate on the same thread concurrently. Various types of thread-switching policies are contemplated for use during instruction fetch and decode. For example, IFU 120 and DEC 140 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 140 or queued dispatched operations for a particular cluster 150 falls below a threshold value, decode processing may switch to that thread until queued operations for a different thread run short. In some embodiments, core 100 may support multiple different thread-switching policies, any one of which may be selected via software or during manufacturing (e.g., as a fabrication mask option).

Generally speaking, clusters 150 may be configured to implement integer arithmetic and logic operations as well as to perform load/store operations. In one embodiment, each of clusters 150*a-b* may be dedicated to the execution of operations for a respective thread, such that when core 100 is configured to operate in a single-threaded mode, operations may be dispatched to only one of clusters 150. Each cluster 150 may include its own scheduler 152, which may be configured to manage the issuance for execution of operations previously dispatched to the cluster. Each cluster 150 may further include its own copy of the integer physical register file as well as its own completion logic (e.g., a reorder buffer or other structure for managing operation completion and retirement).

Within each cluster 150, execution units 154 may support the concurrent execution of various different types of operations. For example, in one embodiment execution units 154 may support two concurrent load/store address generation (AGU) operations and two concurrent arithmetic/logic (ALU) operations, for a total of four concurrent integer operations per cluster. Execution units 154 may support additional operations such as integer multiply and divide, although in various embodiments, clusters 150 may implement scheduling restrictions on the throughput and concurrency of such additional operations with other ALU/AGU operations. Additionally, each cluster 150 may have its own data cache 156 that, like instruction cache 110, may be implemented using any of a variety of cache organizations. It is noted that data caches 156 may be organized differently from instruction cache 110.

In the illustrated embodiment, unlike clusters 150, FPU 160 may be configured to execute floating-point operations from different threads, and in some instances may do so concurrently. FPU 160 may include FP scheduler 162 that, like cluster schedulers 152, may be configured to receive, queue and issue operations for execution within FP execution units 164. FPU 160 may also include a floating-point physical register file configured to manage floating-point operands. FP execution units 164 may be configured to implement various types of floating point operations, such as add, multiply, divide, and multiply-accumulate, as well as other floating-point, multimedia or other operations that may be defined by the ISA. In various embodiments, FPU 160 may support the concurrent execution of certain different types of floating-point operations, and may also support different degrees of precision (e.g., 64-bit operands, 128-bit operands, etc.). As shown, FPU 160 may not include a data cache but may instead be configured to access the data caches 156 included within clusters 150. In some embodiments, FPU 160 may be configured to execute floating-point load and store instructions, while in other embodiments, clusters 150 may execute these instructions on behalf of FPU 160.

Instruction cache 110 and data caches 156 may be configured to access L2 cache 180 via core interface unit 170. In one embodiment, CIU 170 may provide a general interface between core 100 and other cores 100 within a system, as well as to external system memory, peripherals, etc. L2 cache 180, in one embodiment, may be configured as a unified cache using any suitable cache organization. Typically, L2 cache 180 will be substantially larger in capacity than the first-level instruction and data caches.

In some embodiments, core 100 may support out of order execution of operations, including load and store operations. That is, the order of execution of operations within clusters 150 and FPU 160 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 150 may be configured to execute conditional branch instructions and determine whether the branch outcome agrees with the predicted outcome. If not, clusters 150 may be configured to redirect IFU 120 to begin fetching along the correct path.

Separately, core 100 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 100 may be configured to perform way prediction as a form of data speculation in instruction cache 110, data caches 156 and/or L2 cache 180, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 100 may implement numerous other types of data speculation, such as address prediction, load/store dependency detection based on addresses or address operand patterns, speculative store-to-load result forwarding, data coherence speculation, or other suitable techniques or combinations thereof.

In various embodiments, a processor implementation may include multiple instances of core 100 fabricated as part of a single integrated circuit along with other structures. A processor may be coupled to system memory consisting of one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory. The contents of system memory may be cached by various ones of the caches described above.

Core 100 may execute any of a variety of prefetch instructions, the details of which will be described in connection with FIGS. 2-10. FIG. 2 illustrates one embodiment of a data prefetch instruction 200. In the illustrated embodiment, instruction 200 includes an opcode 210 and bit fields 211-221. Bit fields 211-221 may contain values for a variety of instruction parameters. For example, in one embodiment, bit fields 211-221 may contain values as indicated in the table at the bottom of FIG. 2. In particular, bit field 211 may contain a start address value. Bit field 212 may contain a block size value in the range of 8-1024 bytes. Bit fields 213-217 may be reserved. Bit field 218 may contain a value indicating the temporal locality of the data that is to be prefetched. Temporal locality, as used herein, may refer to the frequency with which a given pattern of data is expected to be needed by upcoming instructions. Commonly used values for temporal locality may include once, infrequent, and frequent, the precise definitions of which may be determined by design choice. Bit field 219 may contain a value indicating whether the data to be prefetched is needed for a read operation or a write operation. Bit field 220 may contain a value indicating that the value in the address bit field is either a direct address or an indirect address. Bit field 221 may contain a value indicating the strength of the need for prefetching associated data. A strength value, as used herein, may be interpreted by microprocessor hardware to determine the priority of prefetches, to refine data speculation results, or in a variety of caching algorithms. In one embodiment, bit field 221 may have one of two values: weak or strong.

Figure 3:
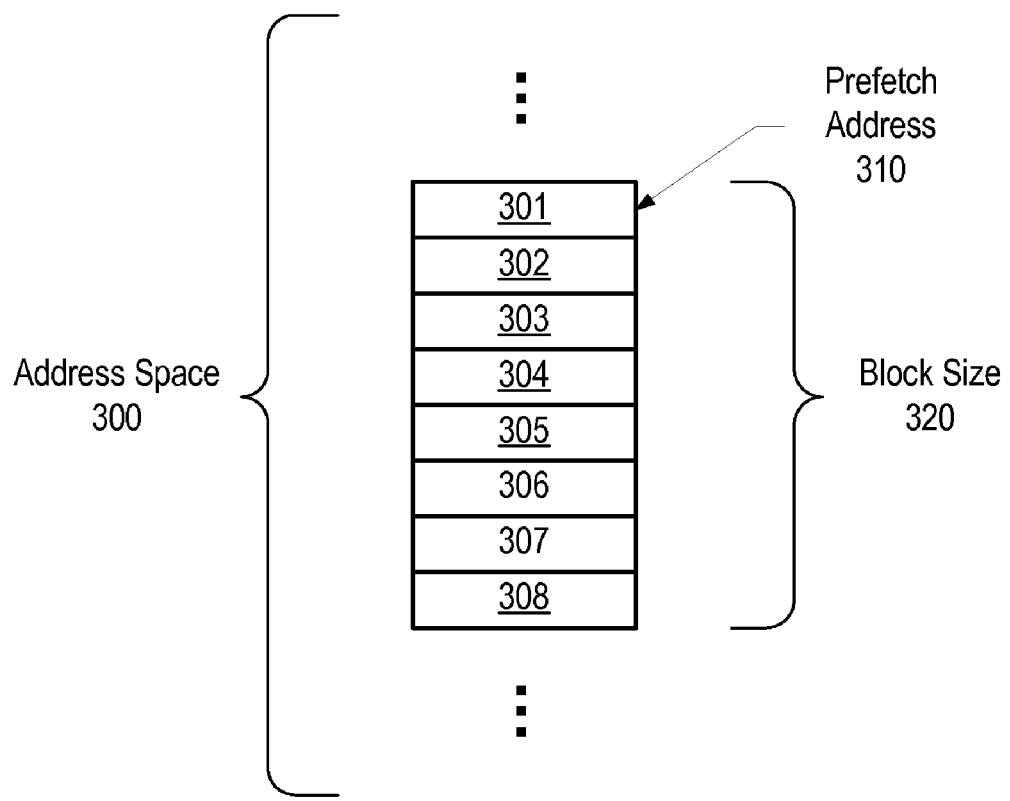
FIG. 3 illustrates one embodiment of a memory address space as seen by a data prefetch instruction using direct addressing.

FIGS. 3-6 illustrate various aspects of the use of data prefetch instructions. FIG. 3 illustrates one embodiment of a memory address space 300 as seen by a data prefetch instruction using direct addressing. Address space 300 includes memory locations 301-308, etc. Generally speaking, in alternative embodiments, an address space may include many more memory locations than those illustrated. An address location, as used herein, may refer to a byte, a word, or any other suitable unit of data storage. An address bit field of a data prefetch instruction may contain a value corresponding to one of the memory locations in address space 300. For example, in the illustrated embodiment, a prefetch address 310 is shown pointing to location 301, indicating that a prefetch instruction's address bit field contains a value corresponding to location 301. In addition, a block size 320 is shown including locations 301-308, indicating that a prefetch instruction's block size bit field contains a value corresponding to eight memory locations. In a further embodiment, each memory location is one byte and a value of "8" indicates a block size of eight bytes. Accordingly, during a directly addressed operation, a data prefetch instruction having a prefetch address value corresponding to location 301 and a block size of eight may cache a block of data taken from memory locations 301-308.

Figure 4:
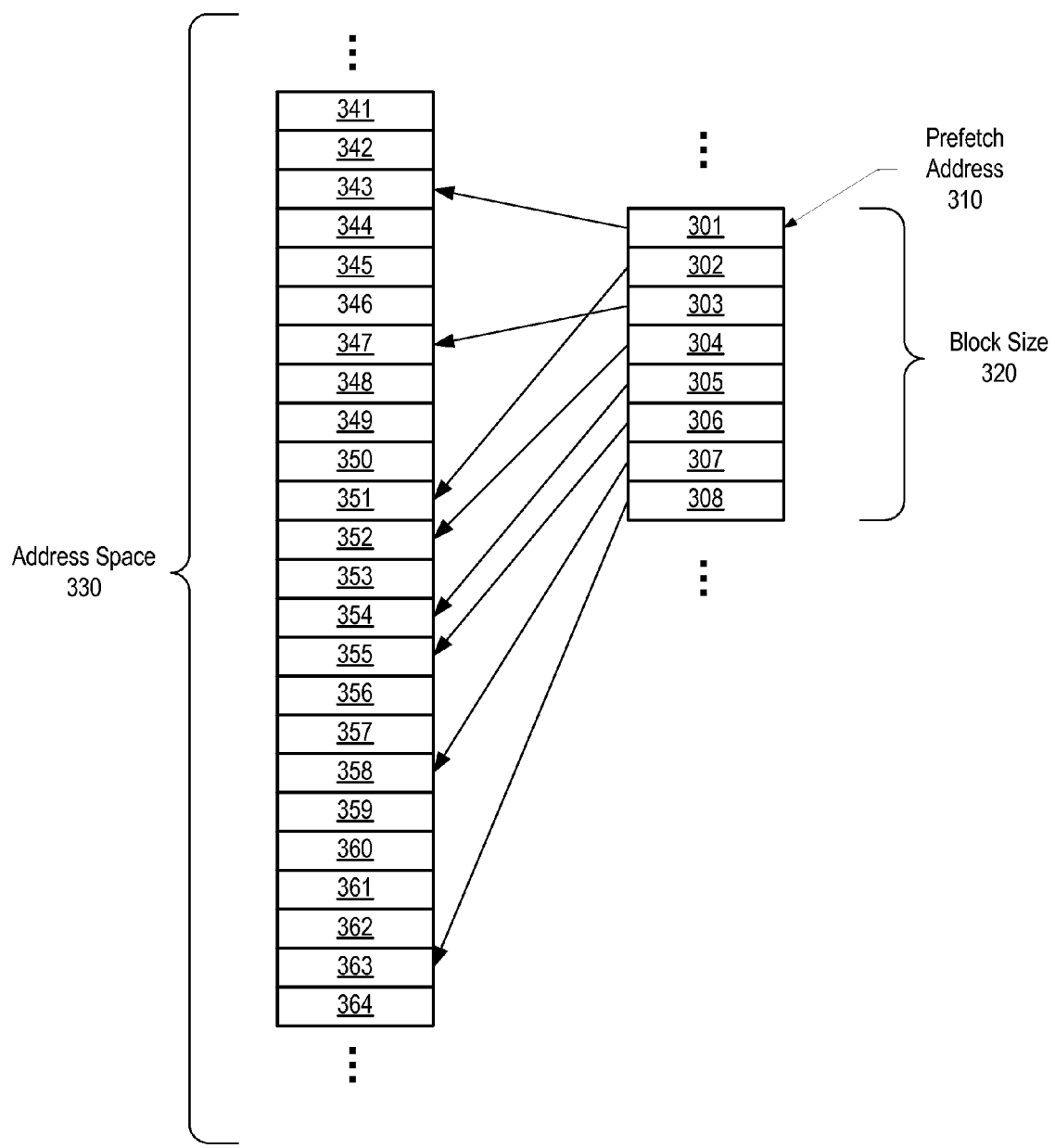
FIG. 4 illustrates one embodiment of a memory address space as seen by a data prefetch instruction using indirect addressing.

FIG. 4 illustrates one embodiment of a memory address space 330 as seen by a data prefetch instruction using indirect addressing. Address space 330 includes memory locations 301-308, etc. and 341-364, etc. Generally speaking, in alternative embodiments, an address space may include many more memory locations than those illustrated. FIG. 4 is similar to FIG. 3 in that, a prefetch address 310 is shown pointing to location 301, indicating that a prefetch instruction's address bit field contains a value corresponding to location 301. In addition, a block size 320 is shown including locations 301-308, indicating that a prefetch instruction's block size bit field contains a value corresponding to eight memory locations. However, since indirect addressing is used in the illustrated embodiment, the data stored in location 301 is not the data to be prefetched, but rather is used as a pointer to another memory location in which the desired data is stored. In the illustration, the value stored in location 301 points to location 343. Similarly, values stored in location 302, 303, 304, 305, 306, 307, and 308 point to locations 351, 347, 352, 354, 355, 358, and 363, respectively. Accordingly, during an indirectly addressed operation, a data prefetch instruction having a prefetch address value corresponding to location 301 and a block size of eight may cache a block of data taken from memory locations 343, 351, 347, 352, 354, 355, 358, and 363.

Figure 5:
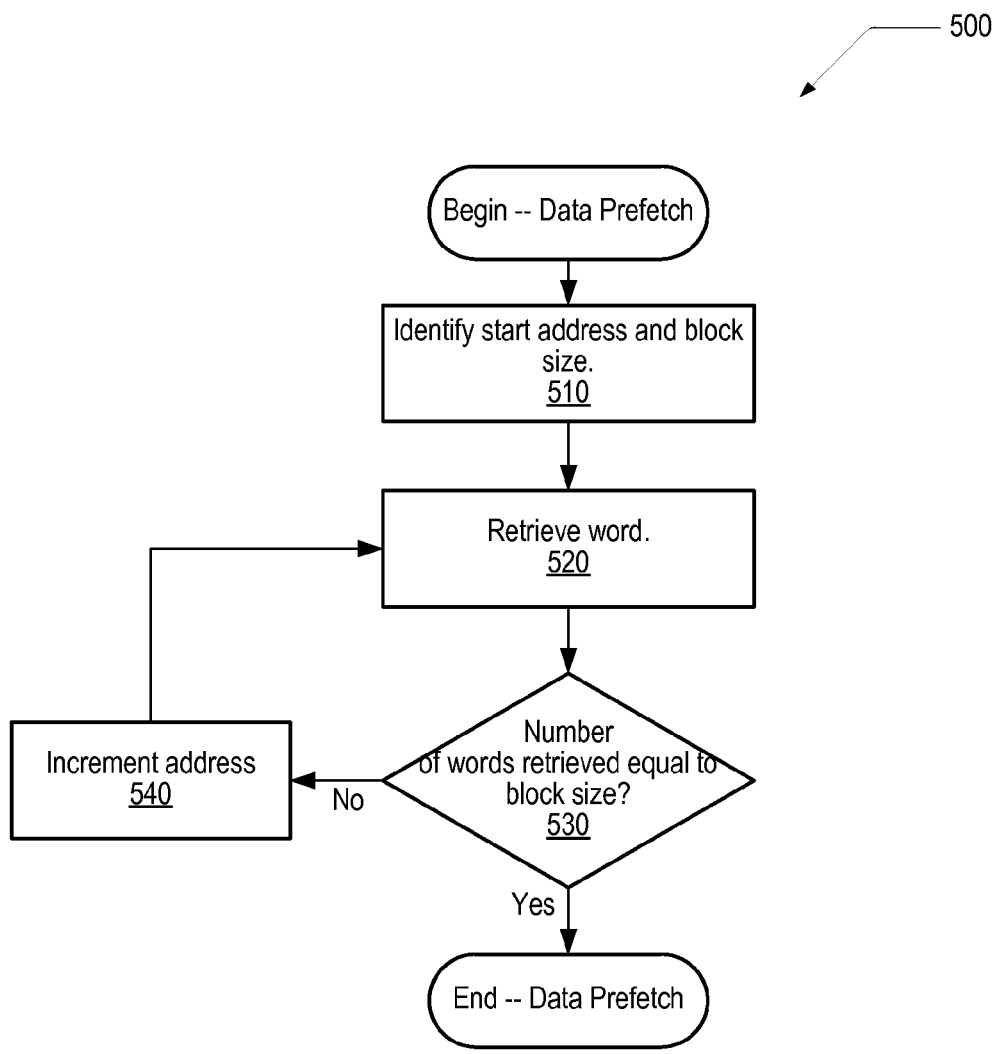
FIG. 5 illustrates one embodiment of a process 500 that may be used by a processor to execute a data prefetch instruction.

FIG. 5 illustrates one embodiment of a process 500 that may be used by a processor to execute a data prefetch instruction. Data prefetch instruction 500 begins with the identification of a start address and a block size for the data to be prefetched (block 510). Next a data byte, word, or other unit of data may be retrieved from the location indicated by the start address, if direct addressing is selected, or from a location pointed to by the contents of the start address, if indirect addressing is selected (block 520). If the number of bytes or words retrieved is not equal to the identified block size (decision block 530), the identified start address may be incremented (block 540) and a next byte or word retrieved (block 520). Process flow may continue to loop through blocks 520, 530, and 540 until the number of bytes or words retrieved is equal to the identified block size (decision block 530), completing execution of the data prefetch instruction. It is noted that in alternative embodiments, the individual blocks illustrated in process 500 may be executed in a different order and/or that some blocks may be executed in parallel with others.

Figure 6:
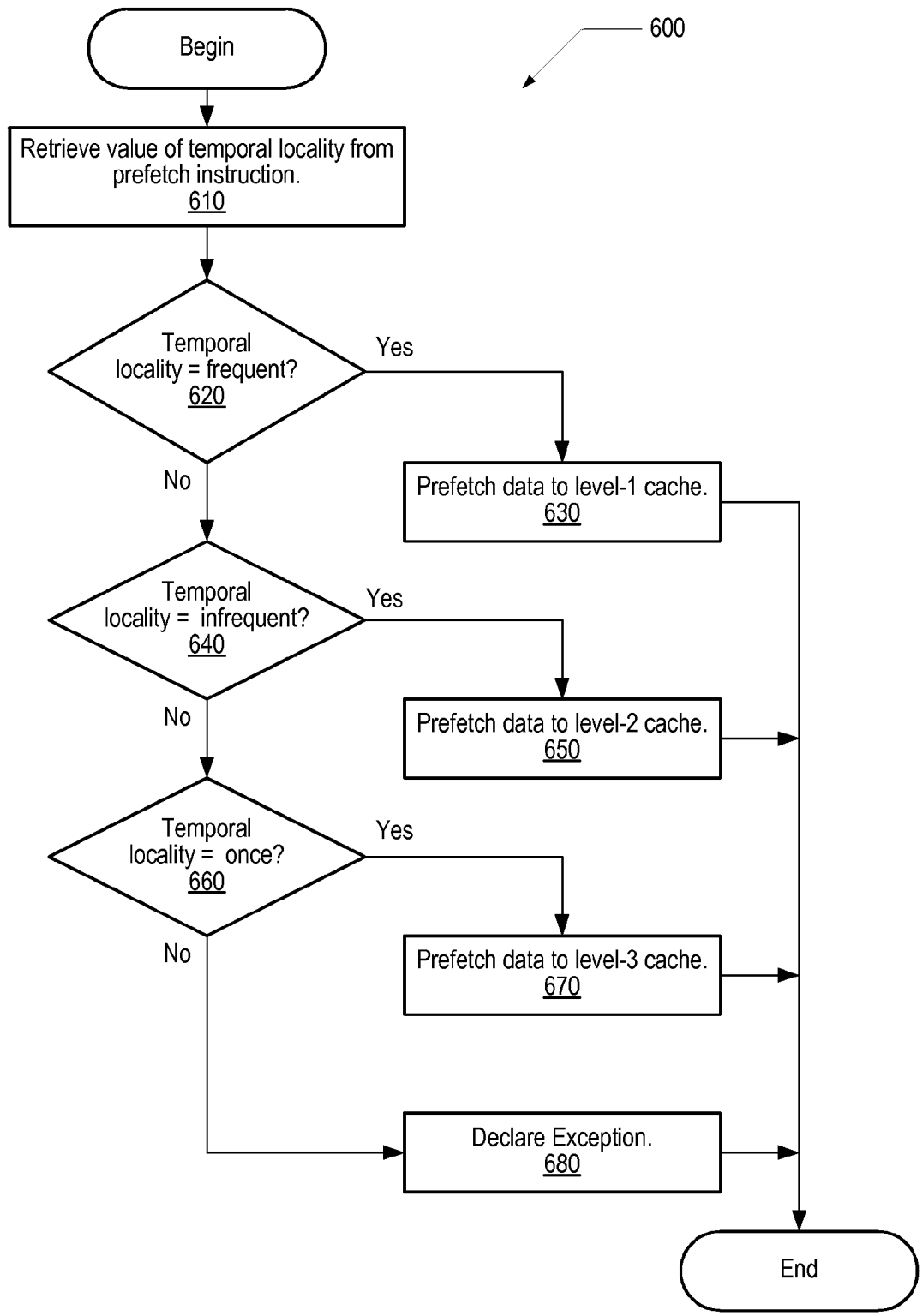
FIG. 6 illustrates one embodiment of a process 600 that may be used by a processor to execute a data prefetch instruction that accounts for temporal locality.

FIG. 6 illustrates one embodiment of a process 600 that may be used by a processor to execute a data prefetch instruction that accounts for temporal locality. Process 600 may begin with retrieval of a value from the temporal locality bit field of a data prefetch instruction (block 610). If the retrieved value indicates that the data addressed by the data prefetch instruction is expected to be frequently needed (decision block 620), then the data may be prefetched into a level-1 cache (block 630) using a process such as process 500 described in association with FIG. 5, completing the data prefetch instruction. If the retrieved value indicates that the data addressed by the data prefetch instruction is expected to be infrequently needed (decision block 640), then the data may be prefetched into a level-2 cache (block 650) using a process such as process 500 described in association with FIG. 5, completing the data prefetch instruction. If the retrieved value indicates that the data addressed by the data prefetch instruction is expected to be needed once (decision block 660), then the data may be prefetched into a level-3 cache (block 670) using a process such as process 500 described in association with FIG. 5, completing the data prefetch instruction. If the retrieved temporal locality value indicates something other than frequent, infrequent, or once, an error may be assumed and an exception declared (block 680), or some other error handling process may be followed by the processor.

FIG. 7 illustrates one embodiment of a stream prefetch instruction 700. In the illustrated embodiment, instruction 700 includes an opcode 710 and bit fields 711-721. Bit fields 711-721 may contain values for a variety of instruction parameters. For example, in one embodiment, bit fields 711-721 may contain values as indicated in the table at the bottom of FIG. 7. In particular, bit field 711 may contain a start address value. Bit field 712 may contain a block size value in the range of 8-256 bytes. Bit field 713 may contain a block count value in the range of 1-256. Block count values greater than "1" may be used to prefetch multiple words in a single operation. Bit field 715 may contain a block stride value in the range of 8-2^32. Block stride, as used herein, may refer to the address interval between words when a block count value is greater than "1". Bit field 714 may contain a sync count value in the range of 0-255. Sync count values greater than "1", may be used to prefetch more than one block of words in a single operation. Bit field 716 may contain a sync stride value in the range of 0-2^32. Sync stride, as used herein, refers to the address interval between blocks of words when a sync count value is greater than "1". It is noted that block stride and sync stride may have different values, allowing complex patterns of data words to be prefetched in a single operation. Bit field 717 may contain a stream number in the range of 0-31. A stream number may be used to differentiate among concurrent streams. For example, in a multiprocessing environment, multiple, long-lived streams may exist simultaneously. A stream number may be used to synchronize individual streams from different stream prefetch instructions. Bit field 718 may contain a value indicating the temporal locality of the data that is to be prefetched. Commonly used values may include once, infrequent, and frequent, the precise definitions of which may be determined by design choice. Bit field 719 may contain a value indicating that the data to be prefetched is needed for either a read or a write operation. Bit field 720 may contain a value indicating that the value in the address bit field is either a direct address or an indirect address. Bit field 721 may contain a value indicating the strength of the need for prefetching associated data. In one embodiment, bit field 721 may have one of two values: weak or strong.

Figure 8:
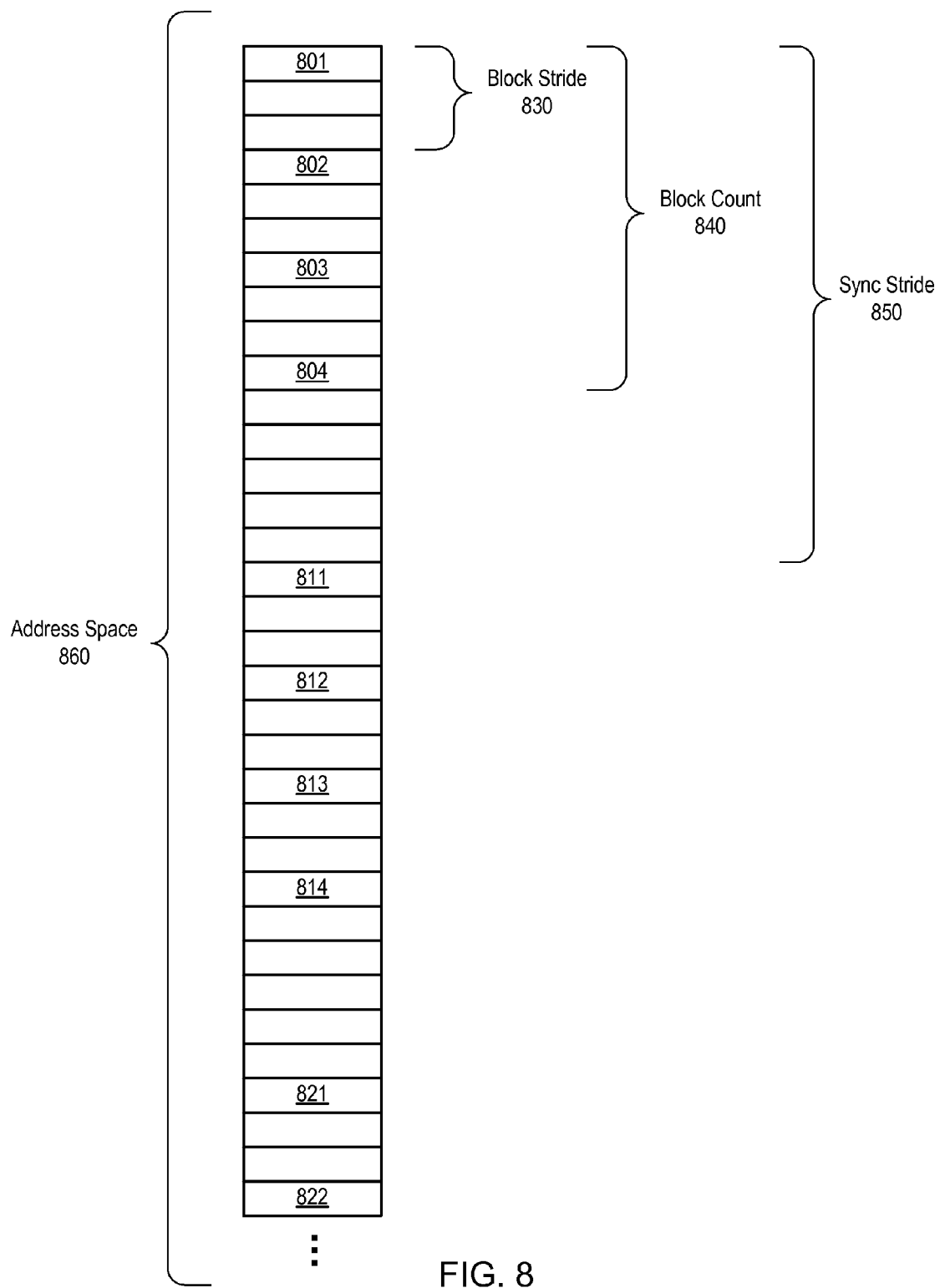
FIG. 8 illustrates one embodiment of a memory address space 860 as seen by a stream prefetch instruction.

FIG. 8 illustrates one embodiment of a memory address space 860 as seen by a stream prefetch instruction. Address space 860 includes a series of contiguous memory locations including non-contiguous words 801, 802, 803, 804, 811, 812, 813, 814, 821, and 822, etc. Generally speaking, in alternative embodiments, an address space may include many more memory locations than those illustrated. Similar to address space 300 as shown in FIG. 3, in the illustrated embodiment, a first word, such as word 801, may be indicated by a start address and the number of words in a first block indicated by a block size, such as words 801, 802, 803, and 804 in the illustrate embodiment in which block count 804 has a value of "4." However, since a stream prefetch instruction may have a non-zero block stride, words 801, 802, 803, and 804 may not be contiguous memory locations. In the illustrated embodiment, a block stride 830 is shown having a value of "3." In addition, in the illustrated embodiment, a sync count greater than zero is shown. A sync stride 850 having a value of "15" is indicated by the number of memory locations between word 801 and word 811. Word 811 is the first word of a second block of words 811-814, in which the block count and block stride illustrated among words 801-804 is repeated. FIG. 8 may represent either direct addressing or indirect addressing, depending on how the data found in each memory location is interpreted.

Figure 9:
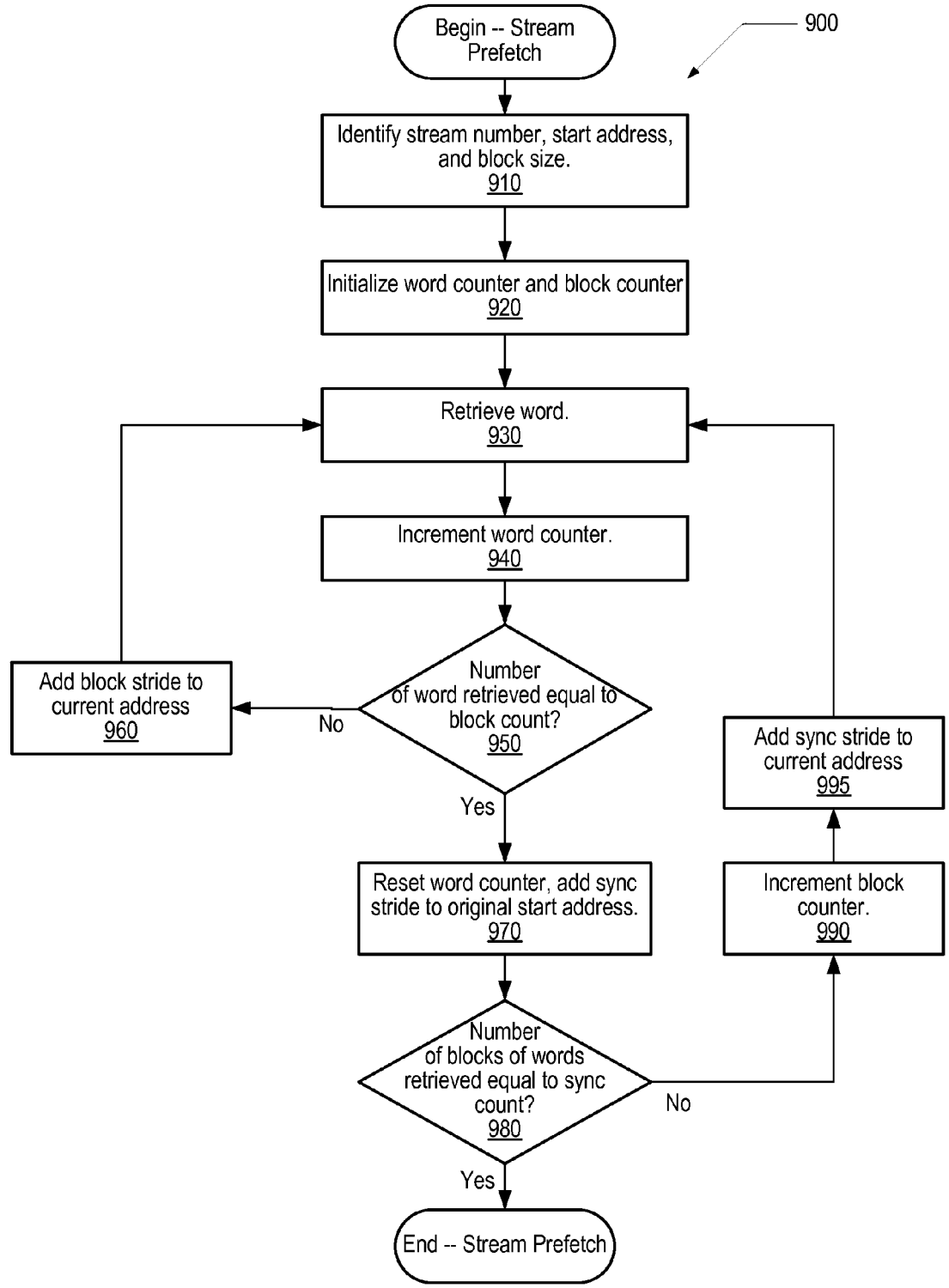
FIG. 9 illustrates one embodiment of a process 900 that may be used by a processor to execute a stream prefetch instruction.

FIG. 9 illustrates one embodiment of a process 900 that may be used by a processor to execute a stream prefetch instruction. Stream prefetch instruction 900 begins with the identification of a stream number, a start address, and a block size for the data to be prefetched (block 910). Next a word counter and a block counter may be initialized (block 920). For example, in one embodiment, each counter may be reset to a zero value. A data byte, word, or other unit of data may be retrieved from the location indicated by the start address, if direct addressing is selected, or from a location pointed to by the contents of the start address, if indirect addressing is selected (block 930). Once a word has been retrieved, the value of the word counter may be incremented (block 940). If the number of bytes or words retrieved is not equal to the identified block size (decision block 50), the block stride may be added to the current address (block 960) and a next byte or word retrieved (block 930). Process flow may continue to loop through blocks 930, 940, 950, and 960 until the value of the word counter is equal to the identified block size. Once the value of the word counter is equal to the identified block size (decision block 940), the word count may be reset and the value of the sync stride may be added to the previous start address (block 970). If the number of blocks of words retrieved is not equal to the value of the sync count (decision block 980), the block counter may be incremented (block 990), the sync stride may be added to the value of the current address (block 995), and a next byte or word retrieved (block 930). If the number of blocks of words retrieved is equal to the value of the sync count (decision block 980), process 900 is complete. It is noted that in alternative embodiments, the individual blocks illustrated in process 900 may be executed in a different order and/or that some blocks may be executed in parallel with others.

FIG. 10 illustrates one embodiment of a hint prefetch instruction 1000. In the illustrated embodiment, instruction 1000 includes an opcode 1010 and bit fields 1011-1021. Bit fields 1011-1021 may contain values for a variety of instruction parameters that may be interpreted to have the same meanings as the values of bit fields 711-721 of FIG. 7. However, in the case of a hint prefetch instruction, no data transfer is implied. Instead, the information contained in the hint prefetch instruction may be used by microprocessor hardware to assist in data speculation decisions or in a variety of caching algorithms, etc.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a processor; and
   a cache memory;
   wherein the processor is configured to execute a prefetch instruction;
   wherein the prefetch instruction includes a first parameter indicating a temporal locality of data to be prefetched.

2. The computer system of claim 1,
   wherein the cache memory comprises a plurality of cache levels; and
   wherein the processor is configured to select one of the cache levels in which to prefetch the block of data words based on a value of the first parameter.

3. The computer system of claim 1, wherein individual words of the block of data words are prefetched from non-contiguous memory addresses.

4. The computer system of claim 3, wherein a single execution of the prefetch instruction allows the processor to prefetch a plurality of blocks of data words into the cache memory.

5. The computer system of claim 4, wherein the prefetch instruction includes:
   a second parameter indicating a number of data words in each block of data words; and
   a third parameter indicating a number of blocks of data words to be prefetched by a single execution of the prefetch instruction.

6. The computer system of claim 4, wherein the prefetch instruction includes:
   a fourth parameter indicating an address interval between each data word of each block of data words; and
   a fifth parameter indicating an address interval between each block of data words of the plurality of blocks of data words.

7. The computer system of claim 1;
   wherein the prefetch instruction includes a sixth parameter indicating a prefetch priority level; and
   wherein the processor is configured to determine whether or not to perform a prefetch operation based on a value of the sixth parameter.

8. A method of prefetching data, the method comprising:
   executing a prefetch instruction, wherein the prefetch instruction comprises a plurality of parameters; and
   prefetching a block of data words into a cache memory, in response to executing the prefetch instruction;
   wherein a first parameter of the plurality of parameters indicates a temporal locality of data to be prefetched.

9. The method of claim 8, wherein the cache memory comprises a plurality of cache levels, the method further comprising selecting one of the plurality of cache levels in which to prefetch the block of data words based on a value of the first parameter.

10. The method of claim 8, wherein individual words of the block of data words are prefetched from non-contiguous memory addresses.

11. The method of claim 10, further comprising prefetching a plurality of blocks of data words into the cache memory in response to executing a single prefetch instruction.

12. The method of claim 11, wherein the prefetch instruction includes:
    a second parameter indicating a number of data words in each block of data words; and
    a third parameter indicating a number of blocks of data words to be prefetched by a single execution of the prefetch instruction.

13. The method of claim 11, wherein the prefetch instruction includes:
    a fourth parameter indicating an address interval between each data word of each block of data words; and
    a fifth parameter indicating an address interval between each block of data words of the plurality of blocks of data words.

14. The method of claim 8, wherein the prefetch instruction includes a sixth parameter indicating a prefetch priority level, the method further comprising determining whether or not to perform a prefetch operation based on a value of the sixth parameter.

15. One or more computer readable storage media storing computer instructions that are executable by a processor to:
    execute a prefetch instruction, wherein the prefetch instruction comprises a plurality of parameters;
    prefetch a block of data words into a cache memory, in response to executing the prefetch instruction; and
    wherein the prefetch instruction includes a first parameter indicating a temporal locality of data to be prefetched.

16. The computer readable storage media of claim 15,
    wherein the cache memory comprises a plurality of cache levels; and
    wherein the instructions are further executable to select one of the plurality of cache levels in which to prefetch the block of data words based on a value of the first parameter.

17. The computer readable storage media of claim 15, wherein individual words of the block of data words are prefetched from non-contiguous memory addresses.

18. The computer readable storage media of claim 17,
    wherein the instructions are further executable to prefetch a plurality of blocks of data words into the cache memory in response to executing a single prefetch instruction; and
    wherein the prefetch instruction includes:
    a second parameter indicating a number of data words in each block of data words; and
    a third parameter indicating a number of blocks of data words to be prefetched by a single execution of the prefetch instruction.

19. The computer readable storage media of claim 18, wherein the prefetch instruction includes:
    a fourth parameter indicating an address interval between each data word of each block of data words; and
    a fifth parameter indicating an address interval between each block of data words of the plurality of blocks of data words.

20. The computer readable storage media of claim 15;
    wherein the prefetch instruction includes a sixth parameter indicating a prefetch priority level; and
    wherein the instructions are further executable to determine whether or not to perform a prefetch operation based on a value of the sixth parameter.

* * * * *